No. 663,913. Patented Dec. 18, 1900.
J. E. LINDBERG & J. A. OLSON.
BICYCLE BRAKE.
(Application filed Aug. 4, 1900.)
(No Model.)
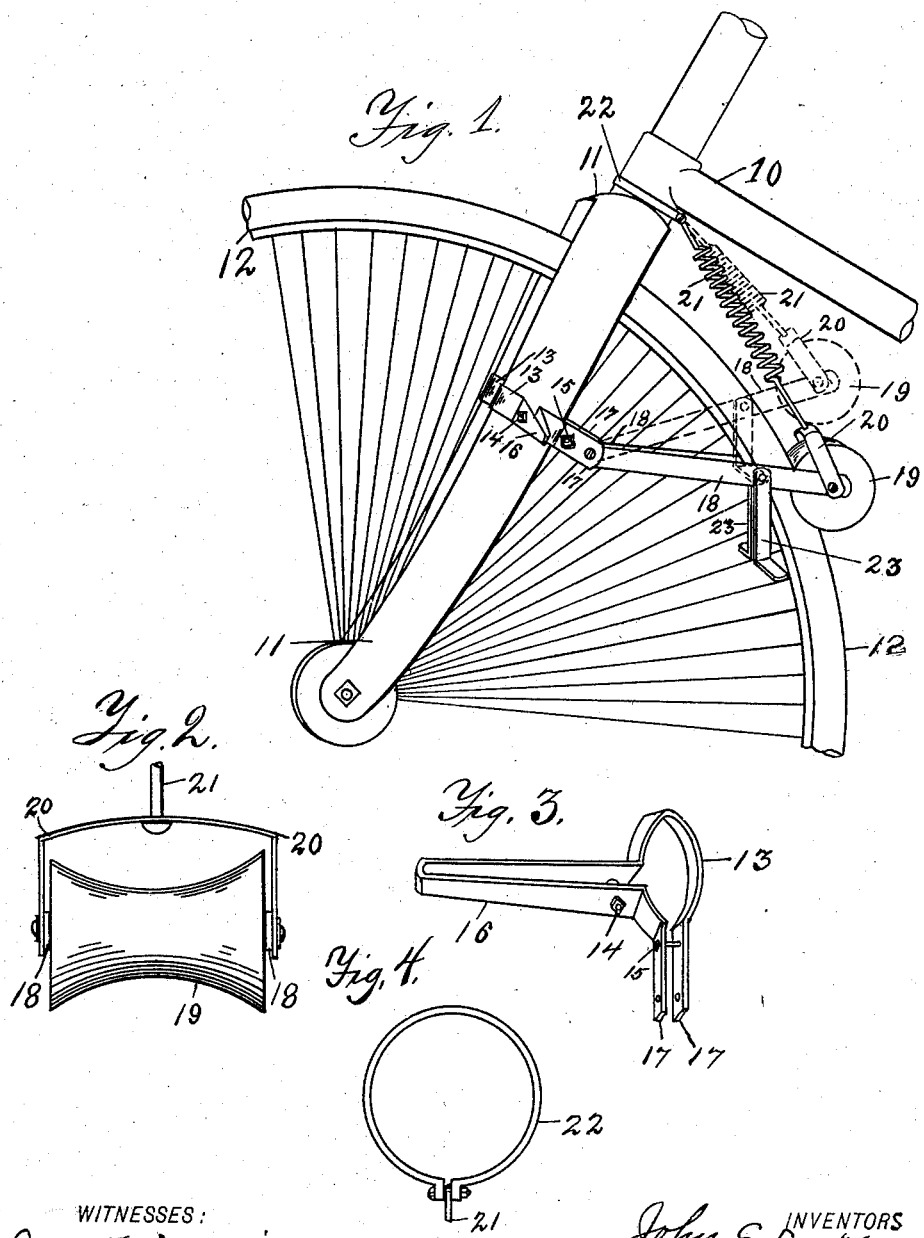
WITNESSES:
Jno. F. Dearing.
N. E. Thomas.
INVENTORS
John E. Lindberg
John A. Olson
BY
Harris & Baldwin
ATTORNEYS.

UNITED STATES PATENT OFFICE.

JOHN E. LINDBERG AND JOHN A. OLSON, OF JAMESTOWN, NEW YORK.

BICYCLE-BRAKE.

SPECIFICATION forming part of Letters Patent No. 663,913, dated December 18, 1900.

Application filed August 4, 1900. Serial No. 25,953. (No model.)

*To all whom it may concern:*

Be it known that we, JOHN E. LINDBERG and JOHN A. OLSON, citizens of the United States, residing at Jamestown, in the county of Chautauqua and State of New York, have invented a new and useful Bicycle Coaster-Brake, of which the following is a specification.

Our invention relates to bicycle-brakes which have "coasters" attached thereto; and our object is to make such a combination in a coaster-brake that it can be firmly attached to the front forks, can be applied instantly with one or both feet, and does away with much of the wear on both tire and brake.

Our simple combination is formed by mechanism illustrated in the accompanying drawings, in which—

Figure 1 is a side elevation, slightly in perspective, of the front forks and part of the frame and front wheel of a bicycle, showing our brake in position for braking on the wheel and in dotted outline as when released. Fig. 2 is a detail view of our spool-shaped roller-brake in bridle. Fig. 3 is a detail view of clip for front fork and coaster-step. Fig. 4 is a detail of ring for attaching spring to fork.

Similar numerals refer to similar parts in the several views.

10 is the bicycle-frame.

11 is the front fork, and 12 the wheel.

13 13 are clips, which are attached to each fork by bolts 14 15, the double draw of these bolts giving a specially tight clamp on the fork, so that the clip will not slip. The clip extends out on one side in coaster-step 16, and the rear ends of the clip 17 17 are pivotally attached to side bars 18 18.

19 is a spool-shaped roller-brake revolubly mounted in the ends of side bars 18 18 and in bridle 20, which bridle is connected with the top of fork 11 by ring 22 and spring 21, as shown. Fig. 4 shows ring 22 with spring 21 broken off.

23 23 are swinging side steps attached to bars 18 18 on each side, which are always in position for use, since they always hang downward whatever the position of the brake. By the simple pressure of the foot of the rider on one step 23 or of both feet on both steps, if greater power is desired, roller-brake 19 is pressed on wheel 12, the foot bringing the brake down from the position shown in dotted outline, and when the foot-pressure is released the brake is instantly drawn up out of the way by spring 21.

We claim as new—

In a bicycle coaster-brake, metal clamps encircling the front forks of a bicycle being formed into coaster-steps on the outer sides and having rear extensions, bolts through said coaster-steps and bolts through said extensions to doubly secure the clamps on the forks, side bars pivotally attached to said extensions, steps pivotally attached to said side bars and a concave roller-brake mounted therein, a bridle pivoted to said bars having a coiled spring and clip to hold the roller-brake off the wheel, as shown and described.

In testimony whereof we have signed our names to this specification in the presence of two subscribing witnesses.

JOHN E. LINDBERG.
JOHN A. OLSON.

In presence of—
A. H. PRICE,
E. E. SPRAGUE.